(12) United States Patent
Hemesath et al.

(10) Patent No.: US 10,231,043 B2
(45) Date of Patent: Mar. 12, 2019

(54) PROTECTIVE COVER FOR PORTABLE WIRELESS SPEAKER AND PROTECTIVE COVER SYSTEM

(71) Applicant: Zagg Amplified, Inc., Midvale, UT (US)

(72) Inventors: Timothy Hemesath, Clovis, CA (US); John Craig Cheney, Orem, UT (US); Bryce Alan Craig, Cedar Hills, UT (US)

(73) Assignee: ZAGG Amplified, Inc., Midvale, UT (US)

( * ) Notice: Subject to any disclaimer, the term of this patent is extended or adjusted under 35 U.S.C. 154(b) by 0 days.

(21) Appl. No.: 15/379,361

(22) Filed: Dec. 14, 2016

(65) Prior Publication Data

US 2017/0180838 A1 Jun. 22, 2017

Related U.S. Application Data

(60) Provisional application No. 62/269,921, filed on Dec. 18, 2015, provisional application No. 62/271,917, filed on Dec. 28, 2015.

(51) Int. Cl.
| | |
|---|---|
| *G06F 3/16* | (2006.01) |
| *A45C 13/10* | (2006.01) |
| *H04R 1/02* | (2006.01) |
| *A45C 11/00* | (2006.01) |
| *H04R 11/02* | (2006.01) |

(Continued)

(52) U.S. Cl.
CPC .............. *H04R 1/026* (2013.01); *A45C 11/00* (2013.01); *A45C 13/002* (2013.01); *A45C 13/1069* (2013.01); *G06F 3/165* (2013.01); *A45C 2011/001* (2013.01); *A45C 2011/002* (2013.01); *A45C 2011/003* (2013.01); *A45C 2200/15* (2013.01); *H04R 2420/07* (2013.01)

(58) Field of Classification Search
CPC .. G06F 1/1628; G06F 2200/1634; G06F 1/16; G06F 1/1632; G06F 1/1656; G06F 1/1677; G06F 1/1679; G06F 1/1669
USPC ........................................ 381/198, 380, 370
See application file for complete search history.

(56) References Cited

U.S. PATENT DOCUMENTS 5,607,054 A * 3/1997 Hollingsworth ...... G06F 1/1628
 206/305
8,607,976 B2 * 12/2013 Wu ........................ G06F 1/1626
 206/320

(Continued)

*Primary Examiner* — Curtis A Kuntz
*Assistant Examiner* — Julie X Dang
(74) *Attorney, Agent, or Firm* — Durham Jones & Pinegar; Sarah W. Matthews; Randall B. Bateman

(57) ABSTRACT

A portable speaker and protective cover for a portable wireless speaker and speaker system is disclosed. The protective cover is configured to receive, retain, cover, protect, and interactively support the portable wireless speaker. A plurality of embedded magnets and/or metallic elements in the speaker and cover are configured and aligned to magnetically secure the protective cover around the portable wireless speaker in the fully closed position and facilitate secure positioning of the speaker in a stand position during use. Other audio, video and computing electronics including tablet and smart phones may also be similarly protected and supported by such a cover configured to the particular dimensions of the electronic device.

20 Claims, 8 Drawing Sheets

(51) Int. Cl.
*A45C 1/02* (2006.01)
*A45C 13/00* (2006.01)

(56) References Cited

U.S. PATENT DOCUMENTS

| | | | | |
|---|---|---|---|---|
| 2008/0302456 A1* | 12/2008 | Cook | A45C 11/00 | 150/154 |
| 2009/0067150 A1* | 3/2009 | Ito | A45C 11/182 | 361/818 |
| 2010/0122924 A1* | 5/2010 | Andrews | A45C 9/00 | 206/320 |
| 2012/0037285 A1* | 2/2012 | Diebel | A45C 11/00 | 150/165 |
| 2012/0250924 A1* | 10/2012 | Nicholson | H04R 1/02 | 381/334 |
| 2014/0003647 A1* | 1/2014 | Liu | H04R 1/026 | 381/386 |
| 2014/0098979 A1* | 4/2014 | Osborn | H04R 5/02 | 381/300 |
| 2015/0295615 A1* | 10/2015 | Smith | A45C 5/02 | 455/575.8 |
| 2016/0051019 A1* | 2/2016 | Sirichai | A45C 11/00 | 206/751 |

\* cited by examiner

PROTECTIVE COVER FOR PORTABLE WIRELESS SPEAKER AND PROTECTIVE COVER SYSTEM

INCORPORATION BY REFERENCE TO RELATED APPLICATIONS

This application claims benefit of priority under 35 U.S.C. § 119(e) from U.S. Provisional Application No. 62/269,921, titled "PROTECTIVE COVER FOR PORTABLE WIRELESS SPEAKER AND PROTECTIVE COVER SYSTEM", filed on Dec. 18, 2015, and U.S. Provisional Application No. 62/271,917, titled "PROTECTIVE COVER FOR PORTABLE WIRELESS SPEAKER AND PROTECTIVE COVER SYSTEM", filed on Dec. 28, 2015, both of which are hereby referenced in their entirety and are to be considered as a part of this specification.

BACKGROUND

Field of the Invention

This patent document relates to portable speaker systems and protective covers or cases for such speakers and other mobile or handheld electronic devices.

Description of the Related Art

Protective cases for electronic devices are known art. There is a continuing need however to improve their configuration, construction and functionality to enhance the user experience.

Accordingly, the inventors here have recognized that there is a need for portable speakers and protective cases for portable speakers that both protect the speaker and provide an interactive stand therefore.

SUMMARY

There exists a continuing need for new and improved portable speakers systems and designs for covers or cases for such speakers that are capable of providing high levels of protection and additional functionality.

Various aspects of a uniquely designed portable speaker and protective cover for the portable speaker are disclosed. The protective cover is also configured to receive, retain, cover, protect, and interactively support the portable speaker. In one aspect, the portable speaker includes functional elements contained in an outer casing or shell housing. The portable speaker may include a plurality of user controls for interacting with and controlling the portable speaker, one or more external electronic ports and a series of perforations to allow the sonic vibrations generated by the functional elements (e.g., an active driver) to pass through the outer shell.

In an additional aspect the configuration of the outer housing includes a curved front side, a curved rear side, a substantially flat left side, a substantially flat right side, a substantially flat top side, and a substantially flat bottom side. Some or all of the user controls may be positioned on one or more of the flat sides to provide user access when the speaker is contained within the outer protective case.

In another aspect, the substantially flat bottom side includes a plurality of embedded magnets configured to secure the protective cover to the speaker in an open use configuration and for securing the protective cover around the speaker in a closed used position. In yet another aspect, the speaker may also include plurality of feet that are configured to be capable of providing additional protection and elevation when the speaker is lying flat with its bottom side residing on a support surface and may also be formed with materials that assist in dampening vibrations. The feet may also be configured in shape and dimension to lock or better position the speaker in place within corresponding conforming surfaces formed within the inside surface of the protective cover.

In yet other aspects, the protective cover is configured in shape and configuration to be capable of providing an interactive stand or support when the cover is open and while the portable speaker is in use position. In one implementation the protective cover includes an outer surface and an inner surface that define, a bottom side cover shell, a first side cover panel, a top side cover shell, a second side cover panel and a flap. One or more depressions may be included in the inner surface to correspond with the protruding components (e.g., the feet) extending from the outer surface of the speaker to assist in properly positioning the speaker vis-à-vis the cover. Embedded magnets and metallic elements may be included in the case and positioned or otherwise configured to secure the protective cover in a variety of selected protective and useful positions by magnetic attraction to the corresponding embedded magnets or elements in the portable wireless speaker.

The magnets in the speaker can be used to also mount or position the speaker onto a stand-alone metallic surface (e.g., a fridge or other appliance or a metal panel on a desk or cabinet either vertical or horizontally oriented) to allow secured placement of the speaker a part from the case.

The design aspects of the portable speaker and protective cover system can provide varied interactive stand positions during use while providing a stylish, compact, and durable design that allows the speaker to be securely protectively encased when not in use to avoid damage when transported such as in a briefcase, backpack, or purse.

While various aspects are described above and in connection with the implementations and embodiments of the protective cover and speaker system disclosed herein, including the drawings and claims, it should be understood that any of these aspects may be combined to form claims for a device, apparatus, system, methods of manufacture and/or use in any way without limitation.

DETAILED DESCRIPTION OF THE PREFERRED EMBODIMENT

Figure 1:
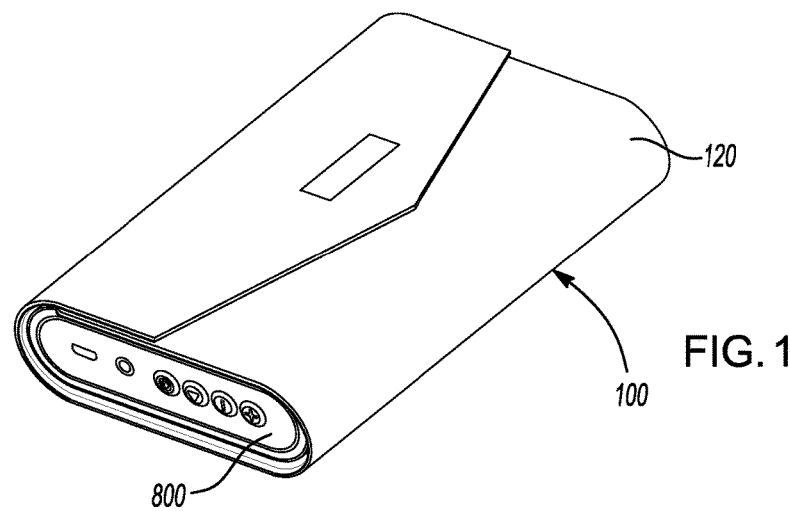
FIG. 1 is a perspective view of a protective cover wrapped around a portable wireless speaker in a fully closed position in accordance with the teachings herein.

Features, aspects and advantages are described below with reference to the drawings, which are intended to illustrate but not to limit the invention. In the drawings, like reference characters denote corresponding features consistently throughout similar embodiments.

FIGS. 1-6 and 10 illustrate various aspects of a single embodiment of a protective cover 100 for a portable wireless speaker 800.

The protective cover 100 has an outer surface 120 and an inner surface 140 configured to receive, retain, cover, protect, and interactively support portable wireless speaker 800. Outer surface 120 and inner surface 140 are preferably made of a flexible material (e.g., silicon, leather, or vegan leather).

Figure 7:
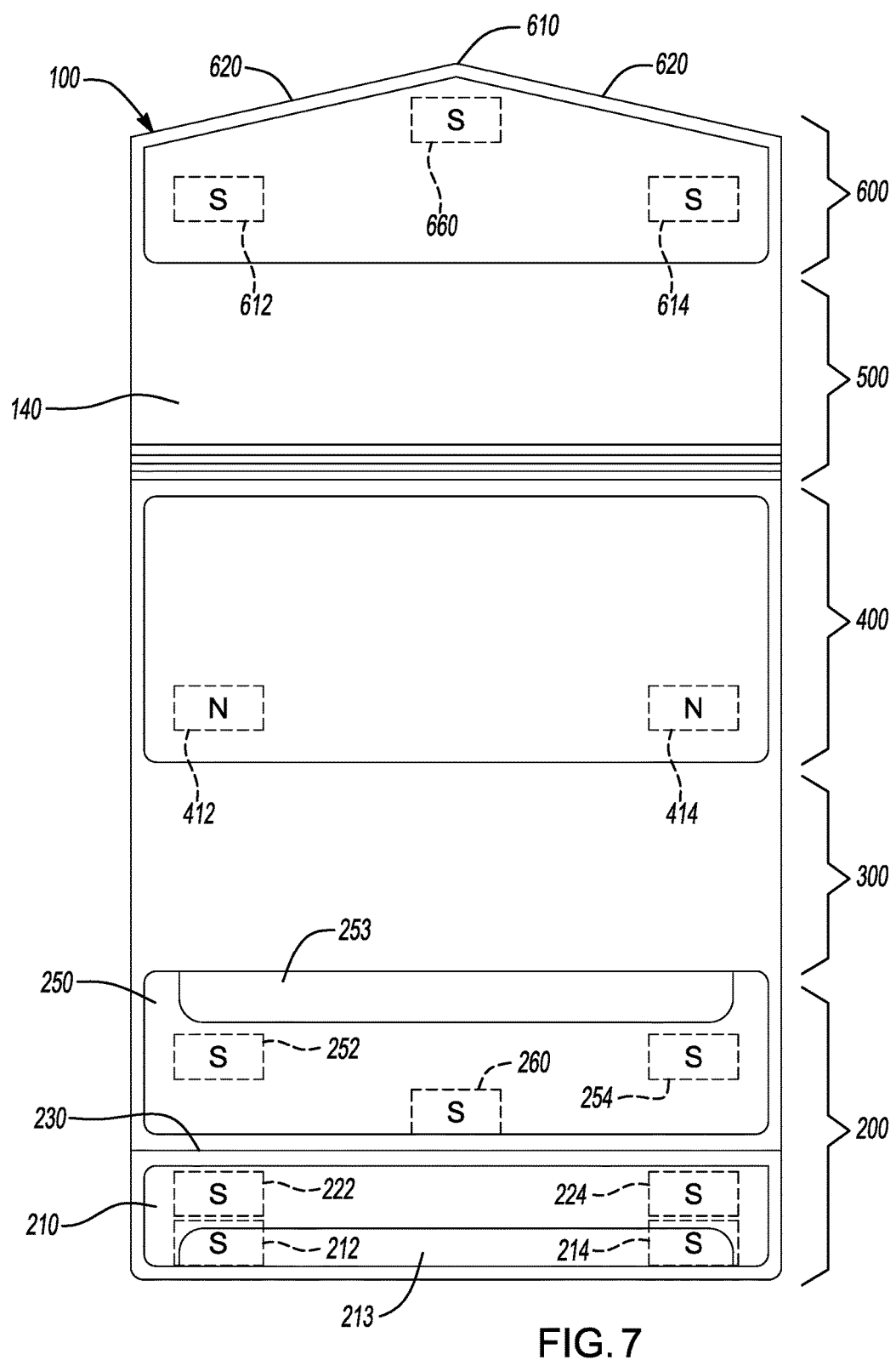
FIG. 7 is a front view of the inner surface of the protective cover illustrated in FIGS. 1-6 and 10, illustrating the position of some of the internal magnets.

Referring also to FIG. 7, protective cover 100 includes a bottom side cover shell 200, a first side cover panel 300, a top side cover shell 400, a second side cover panel 500 and a flap 600.

Figure 9A:
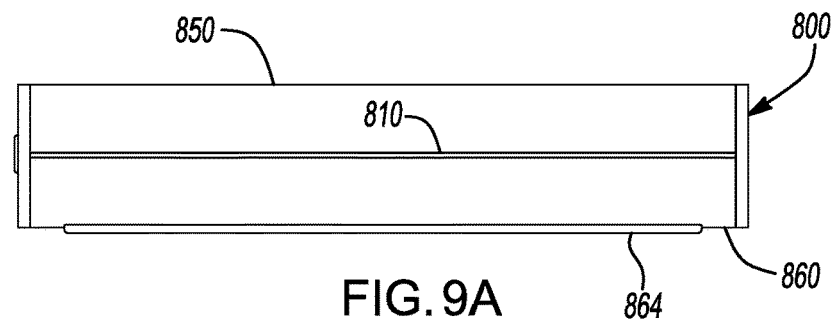
FIGS. 9A-9F are front, rear, left, right, top and bottom views, respectively, of the portable wireless speaker illustrated in FIGS. 1-6 and 10.
Figure 9B:
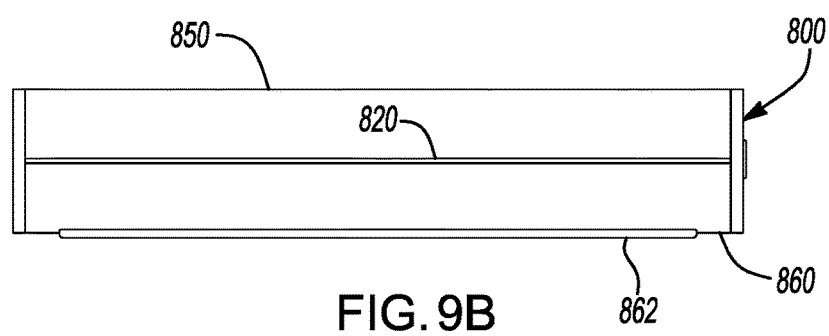
Figure 9C:
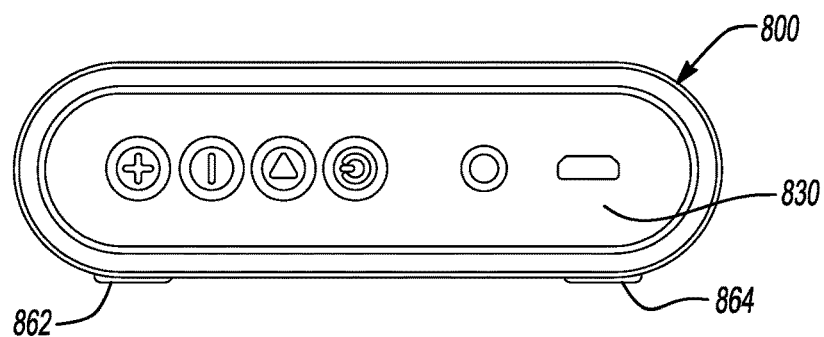
Figure 9D:
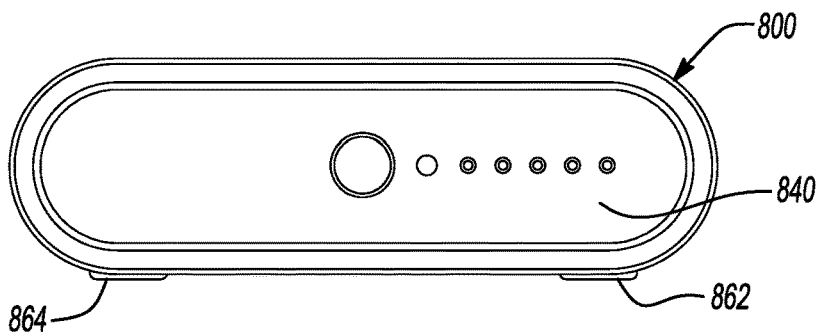
Figure 9E:
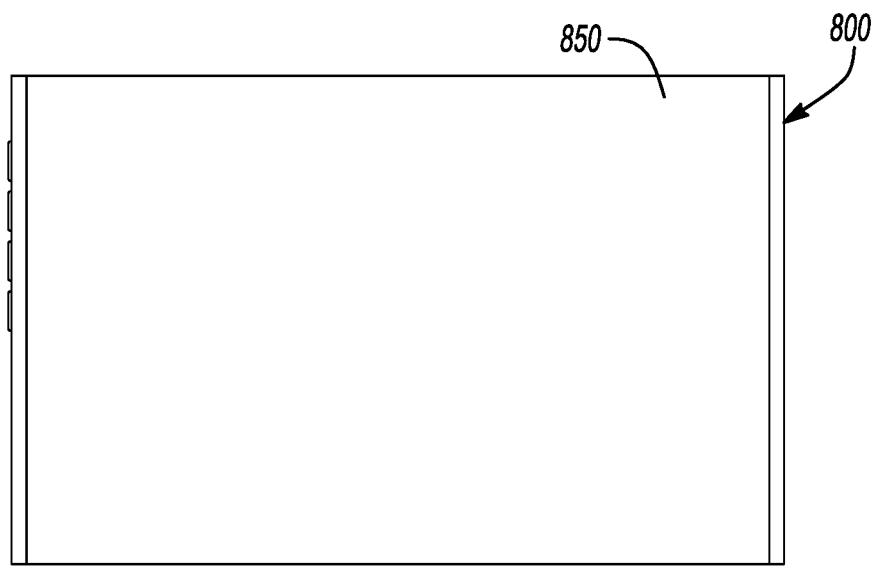
Figure 9F:
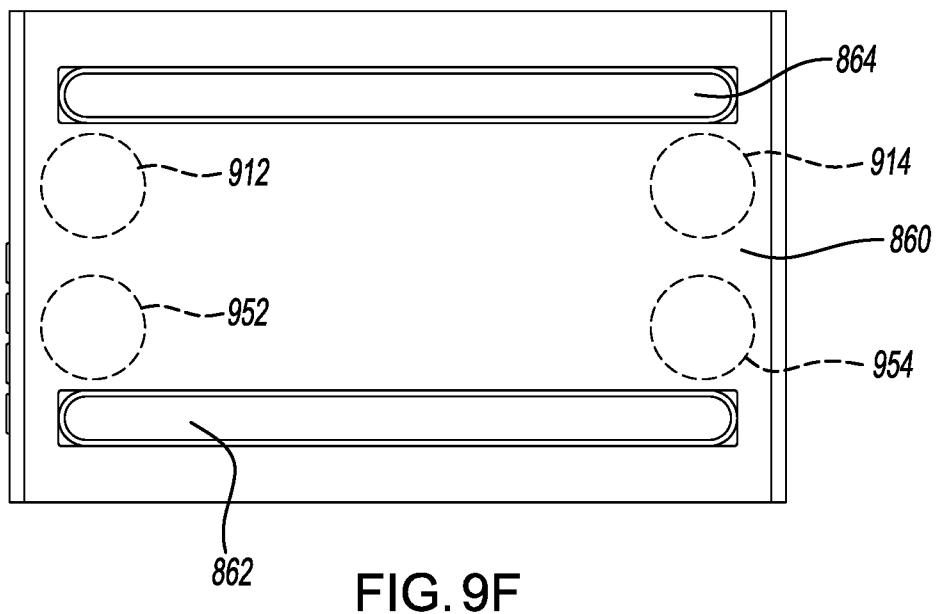

Bottom side cover shell 200 may include an end section 210 and a second section 250. The end section 210 preferably includes a relatively rigid material embedded between the outer surface 120 and the inner surface 140. Depression 213 may be defined by the edge of the relatively rigid materials embedded in end section 210. The second section 250 also preferably includes a relatively rigid material embedded between the outer surface 120 and the inner surface 140. Depression 253 may be defined by the edge of the relatively rigid materials embedded in second section. Depressions 213, 253 may be configured, shaped, or molded to pair with feet 862, 864, respectively, of portable wireless speaker 800 (see FIG. 9F).

A relatively soft joint line 230 is provided between the end section 210 and the second section 250 so that the end section 210 can rotate or flex relative to the second section 250 along joint line 230. The joint line may be formed by excluding from that region the relatively rigid material encased within the inner and outer surfaces of the cover or may be formed via a mechanical hinge structure. Alternatively, less rigid materials may be used in the joint areas to facilitate the desired folding or rotation of the cover.

The top side cover shell 400 preferably includes a relatively rigid material embedded between the outer surface 120 and the inner surface 140.

The first and second side cover panels 300, 500 are in a one implementation flexible and configured or molded to conform to the curves of front side 810 and rear side 820 when protective cover 100 is wrapped around portable wireless speaker 800, and therefore not include a relatively rigid embedded material between outer surface 120 and inner surface 140.

The flap 600 may include a relatively rigid material embedded between the outer surface 120 and the inner surface 140. In the present embodiment, the front edge 620 of flap 600 has a tip or grasp tab 610 to facilitate opening the cover 100. In other embodiments, the front edge 620 of flap 600 may take other shapes, for example, a straight edge line or a curved edge line.

Figure 8A:
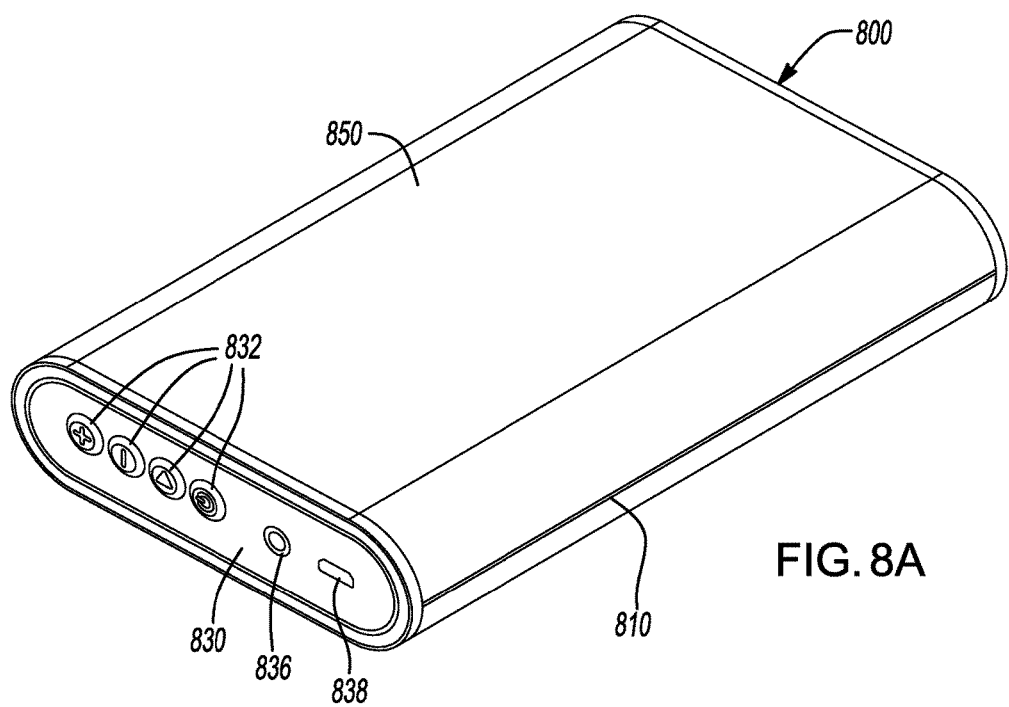
FIG. 8A is a perspective view of the front, left, and top sides of the portable wireless speaker illustrated in FIGS. 1-6 and 10.
Figure 8B:
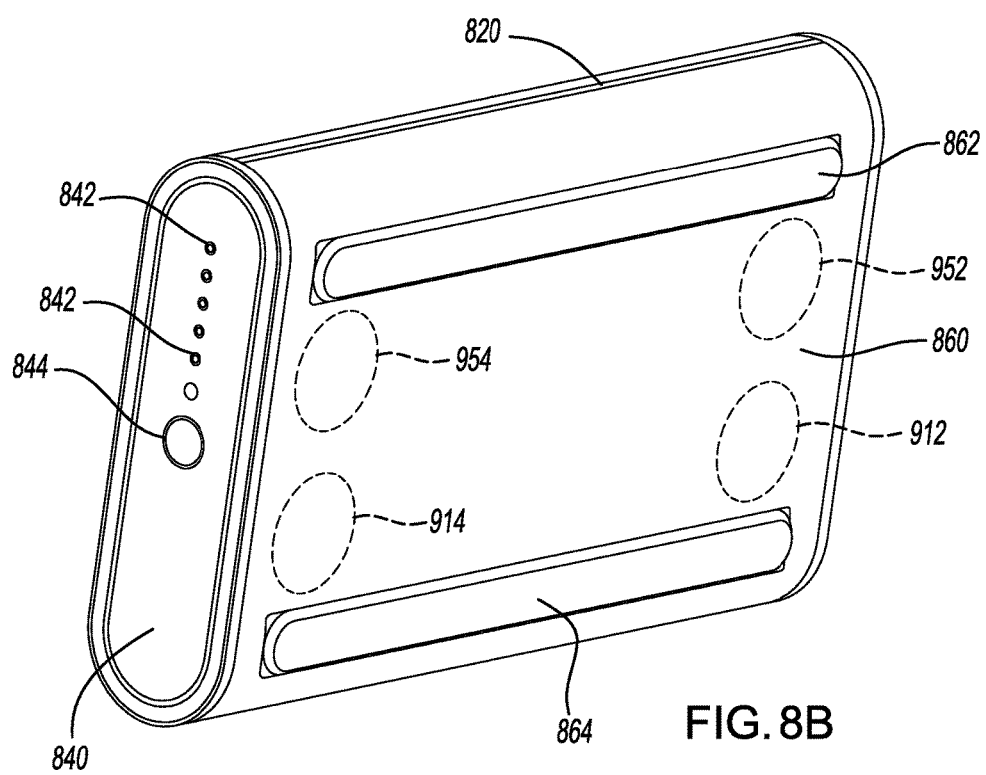
FIG. 8B is a perspective view of the rear, right, and bottom sides of the portable wireless speaker illustrated in FIGS. 1-6 and 10.

The rigid materials are embedded in end section 210, second section 250, top side cover shell 400, and flap 600 to provide additional durability to protective cover 100 and additional protection to the corresponding flat portions of portable wireless speaker 800 including top side 850 and bottom side 860 (see FIGS. 8A and 8B). The embedded rigid material additionally functions as a structural guide, configured to disable flexing or bending throughout the rigid element. The regions of protective cover 100 without embedded relatively rigid materials are configured to flex and conform to the outer shell of portable wireless speaker 800. The rigid and flexible portions of protective cover 100 would preferably be adjusted to enclose different shapes of portable wireless speaker 800.

In one embodiment, the rigid material embedded between outer surface 120 and inner surface 140 on the end section 210, second section 250, top side cover shell 400, and flap 600 is made of polycarbonate.

It should be understood, however, that the rigid materials embedded within the cover shell 200 may be made of any suitable material such as relatively rigid plastic or metal. Employing metal internal panels or components within the cover may further assist in securing the speaker through magnetic attraction to the cover. While relatively rigid materials may be preferable to provide desired rigidity to the cover, it may be preferable to exclude such rigid materials to make the case more compliant or to include such rigid materials on the external surface of the cover as opposed to or in combination with the employment of such rigid materials internally. Moreover, it is contemplated that the same or different rigid materials may be used in different areas of the cover.

End section 210 also contains magnets 212, 214, 222, 224 embedded between outer surface 120 and inner surface 140. Second section 250 contains magnets 252, 254, 260 embedded between outer surface 120 and inner surface 140.

Top side cover shell 400 contains magnets 412, 414 embedded between outer surface 120 and inner surface 140.

Flap 600 contains magnets 612, 614, 660 embedded between outer surface 120 and inner surface 140. Any of these magnets may be embedded on either side of the relatively rigid material or embedded inside of the relatively rigid material. The relatively rigid material may be configured, molded, or formed around the magnets.

In the illustrated embodiment, the polarity of magnets 212, 214, 222, 224, 252, 254, 260, 612, 614, 660 facing the inner surface 140 direction are the same.

In the illustrated embodiment, the polarity of magnets 412, 414 facing the inner surface direction are the same but opposite to the polarity of magnets 612, 614. For illustration and example, the south pole of magnets 212, 214, 222, 224, 252, 254, 260, 612, 614, and 660 may be configured or aligned to face inner surface 140, while the north pole of magnets 412, 414 may be configured or aligned to face inner surface 140. Correspondingly, the south pole of magnets 412, 414 face outer surface 120. Due to this configuration, magnets 412, 414 repel magnets 912, 914, 952, 954, which may assist users to properly align portable speaker 800 before wrapping protective speaker 100 around portable speaker 800. It should be understood however that the polarity and strength of the magnet elements may be changed to facilitate the desired magnetic attraction between the case and the speaker.

Referring also to FIGS. 8A-9F, the outer casing or shell housing of portable wireless speaker 800 has a front side 810, rear side 820, left side 830, right side 840, top side 850 and bottom side 860.

Portable wireless speaker 800 is powered by an internal battery (not shown) and controlled by internal electronic components (e.g., power supply, processor, memory, and a BLUETOOTH® wireless control device, not shown). Portable wireless speaker 800 includes an active driver (not shown) that vibrates, generating sound waves.

The top side 850 can include a series of perforations or holes 852 (the holes 852 are not shown in the figures, but their position is indicated in at least FIG. 3 and in the provisional applications) where the top side covers the active driver (not shown) designed and configured to allow sound waves to pass through the outer casing or shell housing. Top side 850 or portion thereof may also be made of a material having magnetic properties (or a ferromagnetic material), such as iron or steel, configured and aligned so that top side 850 is attracted to any of the magnets mentioned, regardless of polarity. The ferromagnetic portion of 850 may be configured to partially extend around the curved surfaces of front side 810 and rear side 820. The perforations or holes 852 (see FIG. 3) may extend from a portion of the front side 810 across top side 850 to a portion of the rear side 820. Other external surfaces of speaker 800 may include perforations or holes 852. The protective cover 100 may also include perforations or holes (not shown) configured to allow sound waves to pass through the protective cover even when the case is fully or partially closed around the speaker.

Top side 850 and bottom side 860 may be substantially planar, and front side 810 and rear side 820 may be substantially rounded or curved molded to connect from top side 850 to bottom side 860. Employment of a substantially planar and substantially curved sides of portable speaker 800 can facilitate both storage and stand interaction with protective cover 100 while providing an elegantly design package. While the illustrated speaker includes rounded sides it should be understood that other speaker shapes may be employed including for example rectangular speakers or speakers that have triangular ends or edges.

Left side 830 can include one or more control buttons 832 (e.g., volume up, volume down, power, and play user control buttons), mini stereo connector 836, and USB communication and/or charging port 838.

Right side 850 can include a battery power indicator 842 and additional control buttons 844. In one embodiment, battery power indicator 842 includes one or more LEDs. When prompted (e.g., by additional control button 844), these LEDs are configured to flash or illuminate indicating a remaining charge level of the internal battery. The LEDs may be configured to communicate remaining charge level by illuminating a number of LEDs (e.g., 3 of 5 LEDs illuminated to indicate approximately 60% charge remaining).

Control buttons 832, battery power indicators 842, and additional control buttons 844 are positioned on right side 850 or left side 830 to provide user access even when protective case 100 is wrapped around speaker 800 in a fully closed position.

Bottom side 860 may include a plurality of feet 862, 864 configured in shape and dimension to support portable wireless speaker 800 in an upright position. Feet 862, 864, may additionally be configured in shape, material, and dimension to provide some cushion from impact and/or to dampen vibration between bottom side 860 and a supporting surface. Feet 862, 864 may additionally be configured in shape and dimension to correspond to depressions 213, 253 (see FIG. 7) in protective cover 100 to secure portable wireless speaker 800 laterally relative to protective cover 100. The feet may be formed of any suitable material including polymers and/or metallic elements and may include a high friction surface (relative to one or more of the other speaker surfaces) to secure the speaker on a supporting surface.

Portable wireless speaker 800 can have magnets 912, 914, 952, 952 located near the bottom side 860. The polarity of magnets 912, 914, 952, 952 are all aligned facing the bottom side 860 direction and are opposite to the polarity of magnets 212, 214, 222, 224, 252, 254 facing inner surface 140. It should be understood however, that the magnet configuration and polarity and strength could vary to facilitate the desired magnetic interaction between the speaker and the cover.

When protective cover 100 is wrapped around portable wireless speaker 800 in a fully closed position as shown in FIG. 1, magnets 912, 914, 952, 952 of portable wireless speaker 800 are configured in location and arrangement to align with and attract to magnets 212, 214, 252, 254 of the bottom side cover shell 200, respectively. Magnets 222, 224 on bottom side cover shell 200 are also configured in location and arrangement so that magnets 912, 914 of portable wireless speaker 800 are also attracted to magnets 222, 224 on bottom side cover shell 200, respectively. The additional magnets can strengthen or provide increased magnetic attraction between portable wireless speaker 800 and end section 210 as compared to the magnetic attraction between the portable wireless speaker 800 and the second section 250. Magnets 612, 614, 660 on the flap 600 are configured in location and arrangement to attract magnets 222, 224, 260 on the bottom side cover shell 200, respectively, to secure a fully closed position. In the closed position, bottom side 860, rear side 820, top side 850, and front side 810 of speaker 800 may be configured to snugly attach to bottom side cover shell 200, first side cover panel 300, top side cover shell 500, and second side cover shell 500 on the inner surface 140 side of protective cover 100, respectively, while the left side 830 and right side 840 of speaker 800 are not covered by protective cover 100. Speaker 800 is configured so that after a 180 degree rotation around an axis passing through the center of top side 850 and bottom side 860, speaker 800 will still fit into the closed position with protective cover 100.

Figure 2:
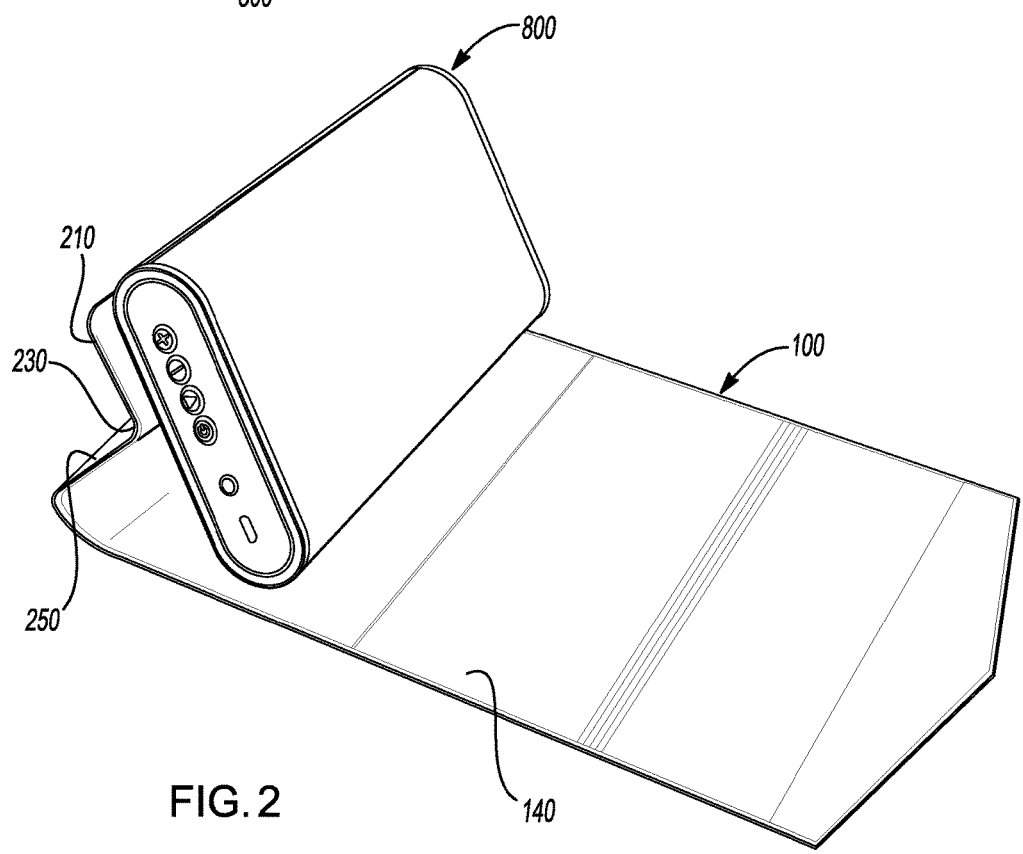
FIG. 2 is a perspective view of the protective cover illustrated in FIG. 1, wherein the protective cover secures the portable wireless speaker in a first operating position in accordance with the teachings herein.

When portable speaker 800 and protective cover 100 are secured in a first operating position as shown in FIG. 2, magnets 952, 954 in portable wireless speaker 800 are attracted to magnets 212, 214, 222, 224 of end section 210, but magnets 912, 914 of portable wireless speaker 800 are disengaged from magnets 252, 254 of second section 250. The same orientation could be maintained in this and other configurations if the speaker is flipped, so the position of magnets 912, 914 would be switched with magnets 952, 954. Foot 862 of speaker 800 may be snugly fitted to depression 213 in protective cover 100. As described, end section 210 is configured to include more magnets (or in an alternate embodiments, stronger magnets), the magnetic attraction between portable wireless speaker 800 and end section 210 remains strong, despite the separation of second section 250 from portable wireless speaker 800. Additionally magnets 412, 414 are configured to attract the ferromagnetic material of top side 850 and a portion of front side 810 to hold front side 810 in place against top side cover shell 400 and this ferromagnetic interaction is configured to be strong enough to keep the attraction between magnets 212, 252 and magnets 912, 914, respectively, from snapping second section against bottom side 860. Additional magnetic can be included in the bottom and or top side 860 and configured and aligned to be magnetically attracted to corresponding magnets or metallic elements in the cover when the cover is in the fully closed position or when the cover is in a stand configuration.

Figure 3:
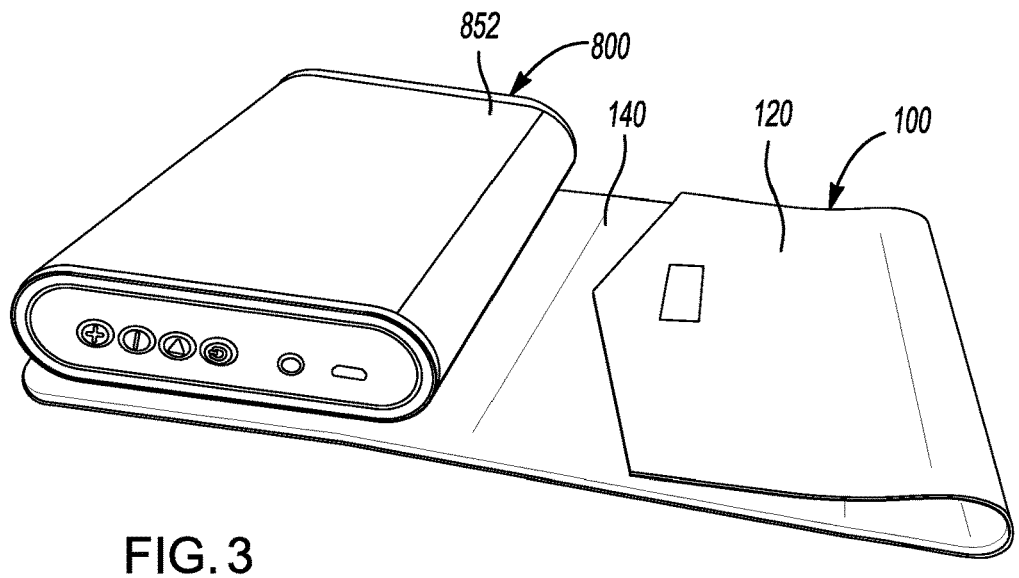
FIG. 3 is a perspective view of the protective cover illustrated in FIG. 1, wherein the protective cover secures the portable wireless speaker in a second operating position in accordance with the teachings herein.

When portable speaker 800 and protective cover 100 are configured in a second operating position as shown in FIG. 3, portable wireless speaker 800 is configured to rest on bottom side cover shell 200 similar to when in the closed position but the first side cover panel 300 is not curved around rear side 820 of portable wireless speaker 800. Feet 862, 864 may be snugly fitted to depressions 213, 253, respectively, in protective cover 100 to further secure portable wireless speaker 800 relative to protective cover 100. Flap 600 is configured so that it can be bent toward portable wireless speaker 800 along second side cover panel 500 so that magnets 612, 614 of flap 600 attract to magnets 412, 414 of top side cover shell 400, respectively.

Figure 4:
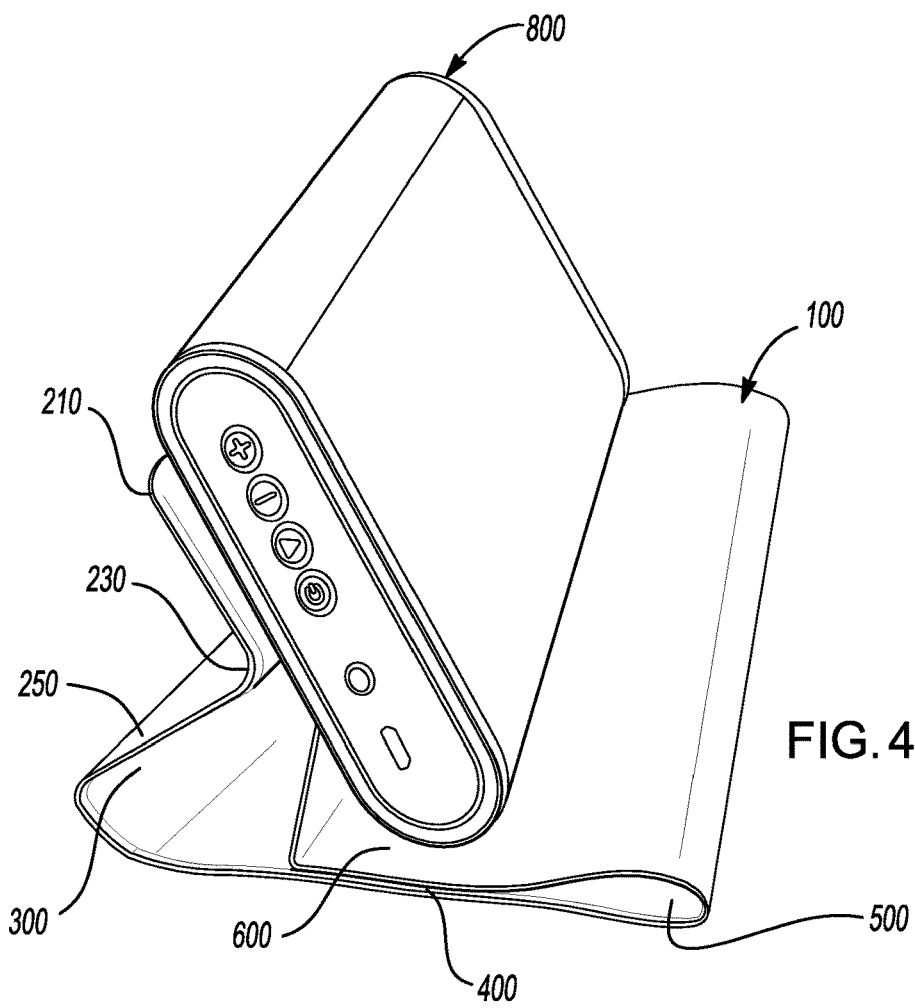
FIG. 4 is a perspective view of the protective cover illustrated in FIG. 1, wherein the protective cover secures the portable wireless speaker in a third operating position in accordance with the teachings herein.

When portable speaker 800 and protective cover 100 are configured in a third operating position as shown in FIG. 4, protective cover 100 is arranged in a position that can be viewed as a combination of the first operating position and the second operating position with magnets 952, 954 on speaker 800 configured to align in this position with and be attracted to magnets 212, 214, 222, 224 of end section 210 while flap 600 is bent down nearly parallel to top side cover shell 400 so that front side 810 of portable wireless speaker 800 rests on outer surface 120 at flap 600. Additionally the polarity of magnets 412, 414 facing outer surface 120 is opposite to the same magnets' polarity facing inner surface 140, but still attracts front side 810 (if ferromagnetic) to top side cover shell 400 and this ferromagnetic interaction is configured to be strong enough to keep the attraction between magnets 252, 254 and magnets 912, 914, respectively, from snapping second section against bottom side 860.

Figure 5:
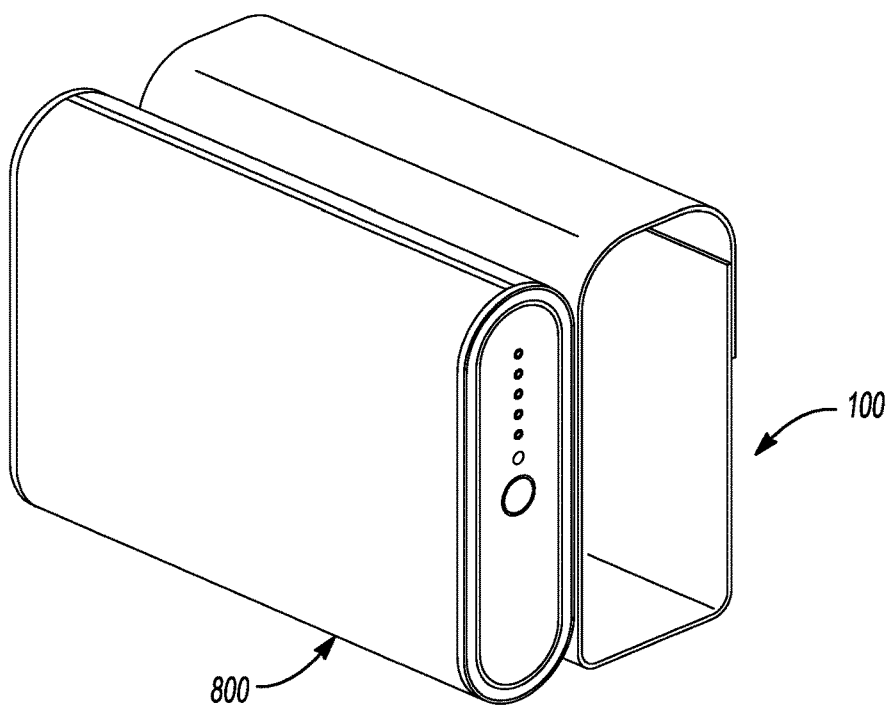
FIG. 5 is a perspective view of the protective cover illustrated in FIG. 1, wherein the protective cover secures the portable wireless speaker in a fourth operating position in accordance with the teachings herein.

When portable speaker 800 and protective cover 100 are configured in a fourth operating position as shown in FIG. 5, protective cover 100 is in a fully closed position (though empty), and portable wireless speaker 800 is supported by connecting to outer surface 120 of closed protective cover 100 at top side cover shell 400. The polarity of magnets 412, 414 facing outer surface 120 is opposite their polarity facing inner surface 140, so in this configuration, magnets 414, 412 of top side cover shell 400 are configured to align with and attract to magnets 912, 914 of speaker 800. A slight variation on this configuration would align magnets 414, 412 of the top side cover shell 400 with magnets 952, 954 of the speaker (in the same orientation), respectively.

Figure 6:
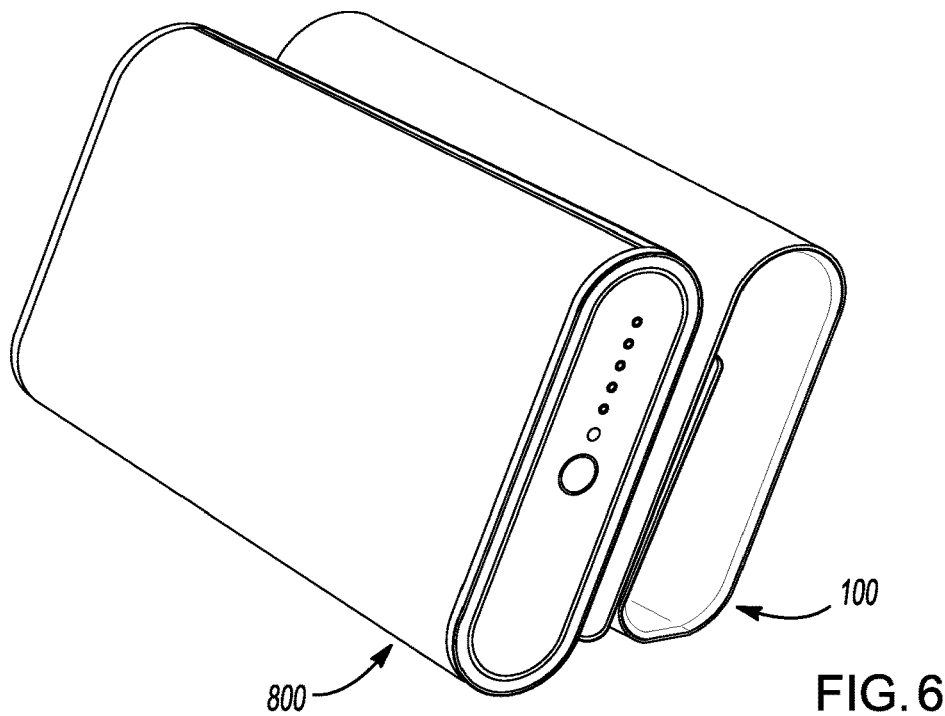
FIG. 6 is a perspective view of the protective cover illustrated in FIG. 1, wherein the protective cover secures the portable wireless speaker in a fifth operating position in accordance with the teachings herein.

When portable speaker 800 and protective cover 100 are configured in a fifth operating position as shown in FIG. 6, protective cover 100 is arranged in a reverse closed position with inner surface 140 of flap 600 bent around and aligned with outer surface 120 of second section 250 so that magnets 612, 614 of flap 600 are configured to attract the reverse polarity of magnets 252, 254 facing the outer surface of bottom side cover shell. In this configuration, the bottom side 860 of portable wireless speaker 800 is aligned with the bottom side cover shell 200 so that magnets 912, 914, 952, 954 of portable wireless speaker align with and are attracted to magnets 212, 214, 252, 254 of bottom side cover shell 200, respectively. A slight variation on this configuration that stands more vertically would align magnets 612, 614, 660 of flap 600 with magnets 222, 224, 260 of bottom side cover shell 200, respectively.

Figure 10:
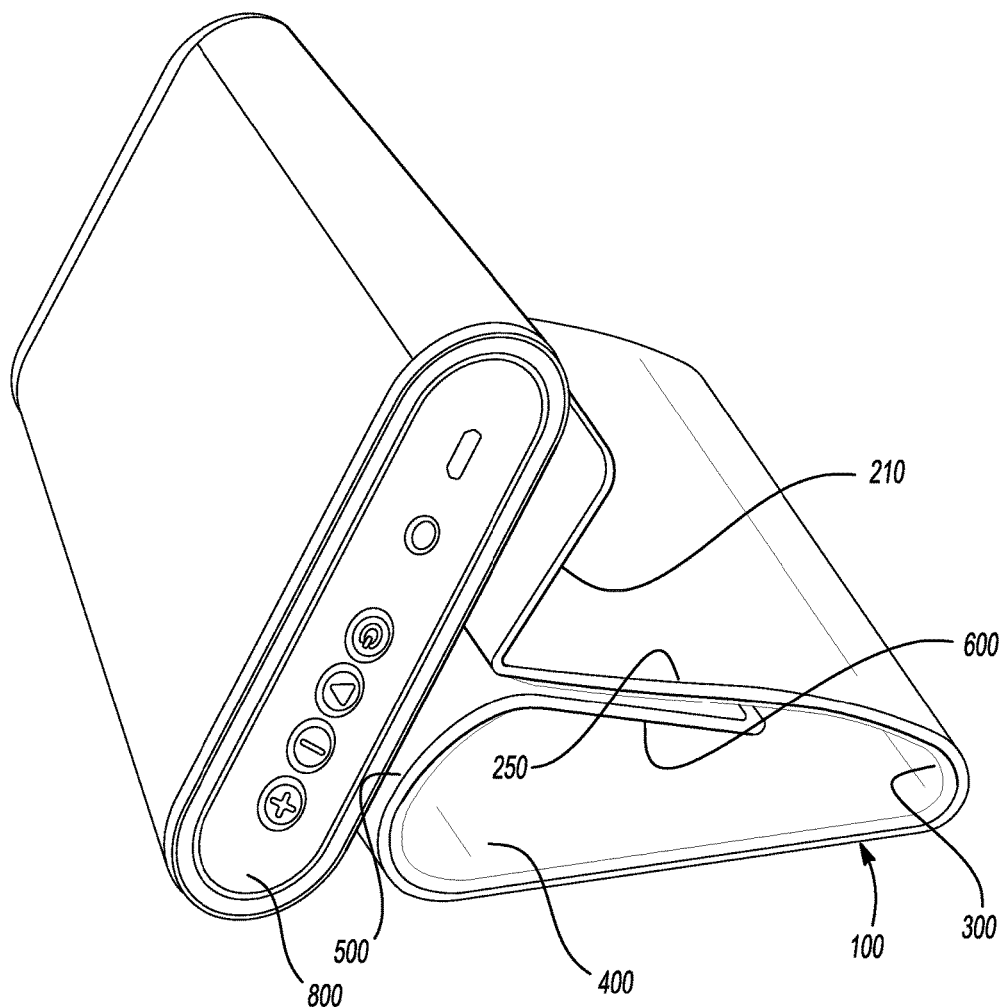
FIG. 10 is a perspective view of the protective cover illustrated in FIG. 1, wherein the protective cover secures the portable wireless speaker in a sixth operating position in accordance with the teachings herein.

When portable speaker 800 and protective cover 100 are configured in a sixth operating position as shown in FIG. 10, magnets 912, 914 in portable wireless speaker 800 are attracted to magnets 212, 214 of end section 210, but magnets 952, 954 of portable wireless speaker 800 are disengaged from magnets 252, 254 of second section 250. Foot 864 of speaker 800 may be snugly fitted to depression 213 in protective cover 100. The flap 600 is folded inwardly relatively to the top side cover shell 400 along the second side cover panel 500 with the flap's front edge 620 facing toward the first side cover panel 300 and a portion of the outer surface of the flap 600 is in contact with the inner surface of the second section 250 with the magnets 612, 614 of the flap 600 attracted to magnets 252, 254 of the second section 250.

Although the illustrated embodiment disclose specific magnetic polarities, it should be understood that alternate polarity configurations could also be used without departing from the present invention. Additionally although magnets were discussed throughout the disclosure, it should be understood that in some embodiments, ferromagnetic materials may be used. For example, bottom side 860 of portable wireless speaker 800 could contain one or more ferromagnetic plates configured to be attracted to the magnets disposed in protective cover 100. Alternatively some shells of protective cover 100 might contain plates or inserts with magnetic properties while other shells might contain magnets.

Also as previously noted, the magnets 912, 914, 952, 954 and feet 862, 864 of portable wireless speaker 800 are configured to enable portable wireless speaker 800 to securely connect to other mounts and surfaces.

The protective cover in the fully closed position resembles a handbag or fashion accessory, and alternative protective covers 100 could be used to update overall style and appearance. A user may also remove a face plate (removability not shown) from left side 830 or right side 840 from portable wireless speaker 800 and replace those face plates to update overall style and appearance. Thus, the speaker system may include multiple covers and multiple exchangeable face plates to facilitate the desired appearance on any given occasion.

In another aspect, the flexible portions of protective cover 100 are constructed of a series of rotating hinges, similar to a watch-band, rather than a flexible material. The series of hinges is configured to curve around the curved portions of portable speaker 800 similar to the way that a watch band wraps around a wrist.

In another aspect, the relatively rigid material embedded between inner surface 140 and outer surface 120 may be replaced with rigid panels that are mechanically connected directly to the series of hinges and not embedded between an inner surface 140 and outer surface 120. Such panels may be exposed on one or both sides or partially exposed by an outer coating. The panels may be made of any rigid material that will provide structure, guiding where protective cover 100 can bend and curve, and protecting portable speaker 800. The panels may be made of materials that either possess or lack magnetic properties, or in some cases are themselves magnets or metallic. If materials with magnetic properties are used, those panels are configured to be attracted to the magnetic elements present in other portions of protective cover 100 or portable wireless speaker 800. Additional padding or cushioning materials may be attached or embedded on either the inside or outside of these rigid panels configured to increase protection or functionality. This padding may be made of natural or synthetic materials (e.g., wood, leather, cotton, micro-fiber, plastic, rubber, or silicone). In some cases decorative elements affixed to the protective cover 100 or portable speaker 800 are configured to function as additional padding.

While the above implementations and aspects primarily discuss portable wireless speakers, it is to be understood that a similar protective cover and magnetic alignment could be configured to work with many other devices without departing from the spirit of the present invention. Such a portable speaker and interactive protective cover would provide similar benefit whether the speaker is wired or wireless. Similarly, it should be understood that the configurations and teachings of the cover and speaker systems can be readily applied to other electronic devices, such as for example, to protect and increase the functionality of cameras, video cameras, security cameras, baby monitors, gaming devices, portable video players, smartphones, tablet devices, and other computing, audio or video devices. In some embodiments, the protective cover could be configured to include more or fewer magnets, more or fewer rigid or flexible panels, different shaped rigid or flexible panels, and cut-outs or pass-through buttons configured to allow user access to ports, sensors or controls of the supported electronic device. For devices with a display or camera lens, it may be desirable to make some elements of protective cover 100 out of a transparent material aligned with the display, lens, or flash.

Although various aspects and implementations are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective cover configured to receive and retain a portable wireless speaker, said protective cover comprising: an outer surface and an innersurface,
   a bottom side cover shell having a plurality of magnets embedded therein, the bottom side cover shell having a length, wherein the bottom side cover shell comprises an end section and a second section, and wherein a soft joint line is provided between the end section and the second section, each of the end second and the second section having a plurality of magnets embedded therein;
   a top side cover shell including a top rigid material embedded between the inner surface and the outer surface, and wherein the top side cover shell comprises at least a first magnet and a second magnet embedded between the inner surface and the outer surface;
   a flap including a third rigid material embedded between the inner surface and the outer surface and having a plurality of magnets embedded therein;
   a first side cover panel connecting the bottom side cover shell and the top side cover shell; and
   a second side cover panel connecting the top side cover shell and the flap, wherein the first side cover panel and the second side cover panel each have a length at least half as long as the length of the bottom side cover shell such that the first side cover panel and second side cover panel can provide a supporting surface to the portable wireless speaker.

2. The protective cover of claim 1, wherein the bottom side cover shell further comprises:
   an end section comprising an end rigid material embedded between the inner surface and the outer surface and having a plurality of magnets embedded therein;
   a second section comprising a second rigid material embedded between the inner surface and the outer surface and having a plurality of magnets embedded therein; and
   a bottom side flex line positioned between the end section and the second section, the bottom side flex line being more flexible than both the end section and the second section, the bottom side flex line being configured to enable the end section to flex relative to the second section.

3. The protective cover of claim 1, wherein the first side cover panel and the second side cover panel are more flexible than the top side cover shell.

4. The protective cover of claim 1, further comprising a portable wireless speaker having a plurality of magnets, and wherein the plurality of magnets of the bottom side cover shell attract the plurality of magnets of the portable wireless speaker, attracting the portable wireless speaker to the inner surface of the protective cover.

5. The protective cover of claim 1, wherein the plurality of magnets embedded in the top side cover shell attract the plurality of magnets embedded in the flap to hold the flap and top side cover shell together when the protective cover is in a closed position.

6. The protective cover of claim 5, further comprising a portable wireless speaker having a top side, and wherein the top side of the portable speaker comprises a ferromagnetic element and the plurality of magnets embedded in the top side cover shell of the protective cover attract to the ferromagnetic element of the portable wireless speaker when the protective cover is in a closed position.

7. A portable speaker and cover system comprising:
   a portable speaker comprising:
   a substantially planar top side;
   a substantially planar bottom side having a plurality of magnets embedded therein;

a curved front side that extends from the top side to the bottom side;
a curved rear side that extends from the top side to the bottom side; and
a plurality of user control inputs; and
a protective cover for the portable speaker, the protective cover comprising:
a bottom side cover shell having a plurality of magnets embedded therein, the bottom side cover shell having a length;
a top side cover shell including a top rigid material embedded between the inner surface and the outer surface and having a plurality of magnets embedded therein;
a flap including a third rigid material embedded between the inner surface and the outer surface and having a plurality of magnets embedded therein;
a first side cover panel connecting the bottom side cover shell and the top side cover shell; and
a second side cover panel connecting the top side cover shell and the flap, wherein the first side cover panel and the second side cover panel have a length, the length of the first side cover panel and the second side cover panel being at least half the length of the bottom side cover shell.

8. The protective cover of claim 7, wherein the plurality of magnets of the bottom side cover shell attract the plurality of magnets of the portable speaker, attracting the portable speaker to the inner surface of the protective cover.

9. The portable speaker of claim 7, wherein the plurality of magnets embedded in the substantially planar bottom side of the portable speaker attract the plurality of magnets of the bottom side cover shell when the protective cover is in a fully closed position.

10. The portable speaker of claim 7, wherein the substantially planar top side of the portable speaker comprises a ferromagnetic material.

11. The portable speaker of claim 7, further comprising a substantially planar left side and a substantially planar right side.

12. The portable speaker of claim 11, wherein the left side and right side of the portable speaker remain exposed when the protective cover is in a fully closed position around the portable speaker and wherein the user control inputs are located on at least one of the left side and the right side of the portable speaker.

13. A portable speaker system comprising:
a protective cover having an outer surface and an inner surface, the protective cover comprising:
a bottom side cover shell having a plurality of magnets embedded therein, the bottom side cover shell having a length;
a top side cover shell including a top rigid material embedded between the inner surface and the outer surface and having a plurality of magnets embedded therein;
a flap including a third rigid material embedded between the inner surface and the outer surface and having a plurality of magnets embedded therein;
a first side cover panel connecting the bottom side cover shell and the top side cover shell; and
a second side cover panel connecting the top side cover shell and the flap, wherein the first side cover panel and the second side cover panel have a length, the length of the first side cover panel and the second side cover panel being at least half the length of the bottom side cover shell; and
a portable speaker comprising:
a substantially planar top side;
a substantially planar bottom side including a plurality of magnets embedded therein;
a curved front side that extends from the top side to the bottom side;
a curved rear side that extends from the top side to the bottom side; and
a plurality of user control inputs.

14. The portable speaker system of claim 13, wherein the bottom side cover shell further comprises:
an end section comprising an end rigid material embedded between the inner surface and the outer surface and having a plurality of magnets embedded therein;
a second section comprising a second rigid material embedded between the inner surface and the outer surface and having a plurality of magnets embedded therein; and
a bottom side flex line positioned between the end section and the second section, the bottom side flex line being more flexible than both the end section and the second section, the bottom side flex line being configured to enable the end section to flex relative to the second section.

15. The portable speaker system of claim 13, wherein the first side cover panel and the second side cover panel are more flexible than the top side cover shell.

16. The portable speaker system of claim 13, wherein the first side cover panel is flexible and configured to enable the bottom side cover shell to fold around the portable speaker relative to the top side cover shell and the second side cover panel is flexible and configured to enable the bottom side cover shell to fold around the portable speaker relative to the top side cover shell.

17. The portable speaker system of claim 13, wherein the protective cover is configured to enable the flap to overlap the bottom side cover shell.

18. The portable speaker system of claim 17, wherein the plurality of magnets embedded in the flap are configured to attract the plurality of magnets embedded in the bottom side cover shell.

19. The portable speaker system of claim 13, wherein the top side of the portable speaker comprises a ferromagnetic element and the plurality of magnets embedded in the top side cover shell attract to the ferromagnetic element when the protective cover is in a closed position.

20. The portable speaker system of claim 13, wherein the protective cover is configured to wrap around the portable speaker and to magnetically attach to the portable speaker when the cover is in a fully closed position and to magnetically attach to and support the speaker on edge when the cover is in an open position.

* * * * *